(12) United States Patent
Gan et al.

(10) Patent No.: US 9,207,861 B2
(45) Date of Patent: Dec. 8, 2015

(54) METHOD AND MOBILE TERMINAL FOR PROCESSING TOUCH INPUT IN TWO DIFFERENT STATES

(75) Inventors: Dayong Gan, Beijing (CN); Lei Lv, Beijing (CN); Xiangtao Liu, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 396 days.

(21) Appl. No.: 13/518,908

(22) PCT Filed: Dec. 24, 2010

(86) PCT No.: PCT/CN2010/002158
§ 371 (c)(1),
(2), (4) Date: Jun. 25, 2012

(87) PCT Pub. No.: WO2011/079514
PCT Pub. Date: Jul. 7, 2011

(65) Prior Publication Data
US 2012/0262405 A1   Oct. 18, 2012

(30) Foreign Application Priority Data
Dec. 31, 2009   (CN) .......................... 2009 1 0244576

(51) Int. Cl.
*G06F 3/041* (2006.01)
*G06F 3/0488* (2013.01)
*G06F 1/16* (2006.01)

(52) U.S. Cl.
CPC .......... *G06F 3/04883* (2013.01); *G06F 1/1694* (2013.01); *G06F 2200/1614* (2013.01)

(58) Field of Classification Search
CPC ................. G06F 2200/1614; G06F 2200/1637
USPC ................... 345/173–183; 715/863
See application file for complete search history.

(56) References Cited

U.S. PATENT DOCUMENTS

RE42,616 E  * 8/2011 Kim et al. ...................... 345/649
8,302,004 B2 * 10/2012 Chen et al. ...................... 715/702
(Continued)

FOREIGN PATENT DOCUMENTS

CN       101371258 A    9/2005
CN       101198925 A    6/2008
(Continued)

OTHER PUBLICATIONS

International Search Report issued for counterpart application PCT/CN2010/002158, date of mailing Mar. 31, 2011.
(Continued)

*Primary Examiner* — Gene W Lee

(57) ABSTRACT

A method and a mobile terminal for processing touch input are provided. The mobile terminal has a rectangular touch screen with long sides and short sides. The mobile terminal having two state: a first state in which only the short sides are parallel with a horizontal surface and a second state in which only the long sides are parallel with the horizontal surface. The method comprises the following steps of: obtaining from the touch screen a gesture in a first direction as input by a touch object on the touch screen when the mobile terminal is in the first state; triggering a first touch command in response to the gesture in the first direction; obtaining from the touch screen a gesture in a second direction as input by the touch object on the touch screen when the mobile terminal is in the second state, the second direction being the same as the first direction; and triggering the first touch command in response to the gesture in the second direction. According to the embodiments of the present invention, it is possible to achieve a uniform operation gesture for the same operational instruction by means of self-conversion of the mobile terminal, such that the user experience can be improved.

9 Claims, 5 Drawing Sheets

(56) References Cited

U.S. PATENT DOCUMENTS

| | | | |
|---|---|---|---|
| 2006/0026521 | A1 | 2/2006 | Hotelling et al. |
| 2006/0170669 | A1* | 8/2006 | Walker et al. ............. 345/418 |
| 2008/0165144 | A1* | 7/2008 | Forstall et al. ............. 345/173 |
| 2008/0165146 | A1* | 7/2008 | Matas ........................ 345/173 |
| 2008/0165152 | A1* | 7/2008 | Forstall et al. ............. 345/173 |
| 2010/0099462 | A1* | 4/2010 | Baek et al. ................. 455/566 |
| 2010/0265269 | A1* | 10/2010 | Matsuda .................... 345/650 |
| 2011/0320983 | A1 | 12/2011 | Chen et al. |

FOREIGN PATENT DOCUMENTS

| | | |
|---|---|---|
| CN | 1674600 A | 2/2009 |
| CN | 101478605 A | 7/2009 |
| CN | 101551723 A | 10/2009 |

OTHER PUBLICATIONS

First Office Action from the State Intellectual Property Office of the People's Republic of China for the parallel Chinese patent application No. 200910244576.1, issued Mar. 1, 2012; 8pgs.

Second Office Action from the State Intellectual Property Office of the People's Republic of China for the parallel Chinese patent application No. 200910244576.1, issued Oct. 30, 2012; 8pgs.

English language Abstract of CN101371258A; 1 pg.

Apple iPod Touch documentation (Chinese language) cited in Second Office Action; 115pgs.

\* cited by examiner

METHOD AND MOBILE TERMINAL FOR PROCESSING TOUCH INPUT IN TWO DIFFERENT STATES

FIELD OF THE INVENTION

The invention relates to communication technology, and more particular, to a method and a mobile terminal for processing touch input.

BACKGROUND OF THE INVENTION

Currently, a terminal with a touch screen, such as a touch handset or a personal digital assistant (PDA), is typically not provided with physical keys. All operations are achieved by touching the touch screen using a gesture. As an example, for an existing touch handset, its touch screen generally displays a longitudinal screen and a user performs touch operations in a longitudinal-screen states. For example, the user's finger can slide on the touch screen towards left, indicating an operational instruction of "return". Then, a processor within the handset can execute the return instruction in response to the touch instruction, so as to output a display interface after the return operation.

From the research of the prior art, the inventors make the following findings. The touch screen of a touch terminal typically displays a longitudinal screen. When the user rotates the terminal to display a lateral screen, the display interface is switched to a display output interface in a lateral-screen state. However, in the prior art, while the display output interface of the touch terminal can be switched between the lateral-screen state and the longitudinal-screen state, the touch gestures cannot be switched as the state of screen changes. In the above example where the user's finger slides on the touch screen towards left, if the touch screen is switched from lateral to longitudinal, then the user needs to switch his/her finger action from sliding towards left to sliding downwards to achieve the operational instruction of "return". In other words, according to the prior art, the user needs to remember touch gestures for different states if the displaying state of the touch screen changes between different states. Since there is no uniform operation gesture for the same operational instruction, the user experience is deteriorated.

SUMMARY OF THE INVENTION

The object of the present invention is to provide a method and a mobile terminal for processing touch input, capable of solving the prior art problem that there is no uniform touch gesture for different states of a touch screen of a touch mobile terminal and the user experience is thus deteriorated.

In order to solve the above problem, the embodiments of the present invention provide the following solutions.

According to an embodiment of the present invention, a method for processing touch input is provided, which is applied in a mobile terminal having a rectangular touch screen with long sides and short sides. The mobile terminal having two states: a first state in which only the short sides are parallel with a horizontal surface and a second state in which only the long sides are parallel with the horizontal surface. The method comprises:

obtaining from the touch screen a gesture in a first direction as input by a touch object on the touch screen when the mobile terminal is in the first state;

triggering a first touch command in response to the gesture in the first direction;

obtaining from the touch screen a gesture in a second direction as input by the touch object on the touch screen when the mobile terminal is in the second state, the second direction being the same as the first direction; and triggering the first touch command in response to the gesture in the second direction.

According to another embodiment of the present invention, a mobile terminal having a rectangular touch screen with long sides and short sides is provided. The mobile terminal has two states: a first state in which only the short sides are parallel with a horizontal surface and a second state in which only the long sides are parallel with the horizontal surface. The mobile terminal comprises:

an obtaining unit configured for obtaining from the touch screen a gesture in a first direction as input by a touch object on the touch screen when the mobile terminal is in the first state;

a triggering unit configured for triggering a first touch command in response to the gesture in the first direction; and a determination unit configured for determining whether the mobile terminal is switched from the first state to the second state;

wherein the obtaining unit is further configured for obtaining from the touch screen a gesture in a second direction as input by the touch object on the touch screen when the mobile terminal is in the second state, the second direction being the same as the first direction; and the triggering unit is further configured for triggering the first touch command in response to the gesture in the second direction.

It can be seen from the above solutions according to the embodiments of the present invention that the mobile terminal according to the present invention has a rectangular touch screen with long sides and short sides. The mobile terminal has two states: a first state in which only the short sides are parallel with a horizontal surface and a second state in which only the long sides are parallel with the horizontal surface. A gesture in a first direction as input by a touch object on the touch screen is obtained from the touch screen when the mobile terminal is in the first state. A first touch command is triggered in response to the gesture in the first direction. A gesture in a second direction as input by the touch object on the touch screen is obtained from the touch screen when the mobile terminal is in the second state, the second direction being the same as the first direction. The first touch command is triggered in response to the gesture in the second direction. With the embodiments of the present application, when a touch gesture is input through a mobile terminal, it is possible to ensure that the same input gesture of the user will trigger the same corresponding touch command, regardless of how the orientation of the mobile terminal changes. Since a uniform operation gesture for the same operational instruction can be achieved by means of self-conversion of the mobile terminal, the user does not need to remember the respective touch gestures in different states of the mobile terminal, such that the user experience can be improved.

DETAILED DESCRIPTION OF PREFERRED EMBODIMENTS

Among the following embodiments of the present invention, some embodiments relate to a method for processing touch input while the other embodiments relate to a mobile terminal. The mobile terminal according to the embodiments of the present invention is a touch mobile terminal having a typically rectangular touch screen with long sides and short sides. For the purpose of explanation, two states of the touch mobile terminal are set: a first state in which only the short sides are parallel with a horizontal surface and a second state in which only the long sides are parallel with the horizontal surface.

In the following, the embodiments of the present invention will be described in further detail with reference to the figures, such that the above objects, features and advantages of the present invention will be more apparent to those skilled in the art.

Figure 1:
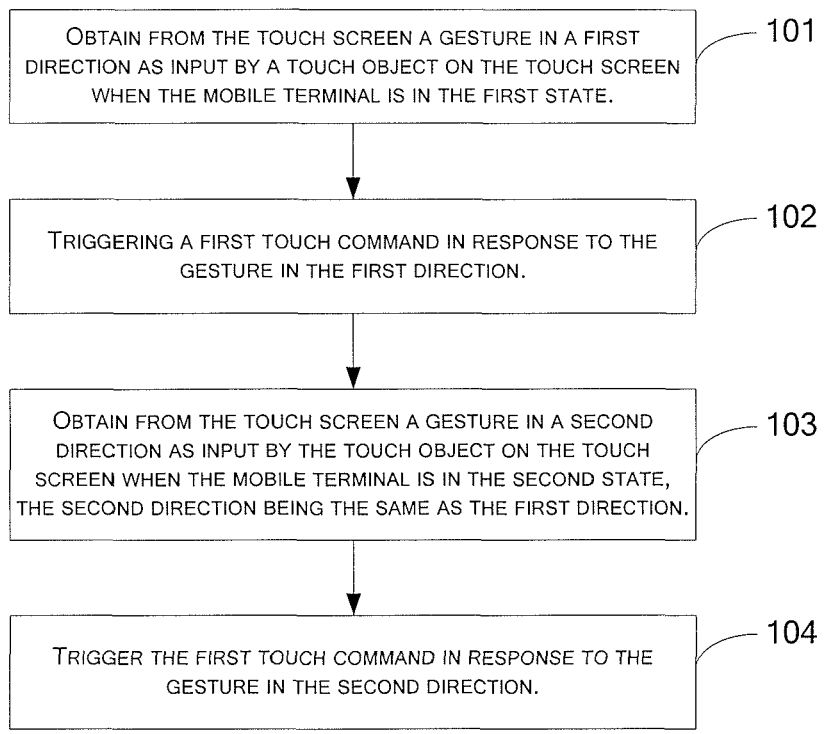
FIG. 1 is a flowchart illustrating the first embodiment of the method for processing touch input according to the present invention.

Reference is now made to FIG. 1, which is a flowchart illustrating the first embodiment of the method for processing touch input according to the present invention.

At step 101, a gesture in a first direction as input by a touch object on the touch screen is obtained from the touch screen when the mobile terminal is in the first state.

At step 102, a first touch command is triggered in response to the gesture in the first direction.

At step 103, a gesture in a second direction as input by the touch object on the touch screen is obtained from the touch screen when the mobile terminal is in the second state. The second direction is the same as the first direction.

Herein, a gravity sensor can be provided in the mobile terminal to detect whether the mobile terminal is in the first state or the second state. In an embodiment, a first gravity parameter value corresponding to the first state and a second gravity parameter value corresponding to the second state can be preset for the gravity sensor. When the gravity sensor senses the first gravity parameter value, a first state message is returned. From the first state message, it can be determined that the mobile terminal is in the first state. When the gravity sensor senses the second gravity parameter value, a second state message is returned. From the first state message, it can be determined that the mobile terminal is in the second state. Alternatively, during the process in which the gravity sensor constantly detects a gravity parameter value, the mobile terminal continuously detects the gravity parameter value. When the parameter value is detected to be the first gravity parameter value, it can be determined that the mobile terminal is in the first state. When the parameter value is detected to be the second gravity parameter value, it can be determined that the mobile terminal is in the second state.

At step 104, the first touch command is triggered in response to the gesture in the second direction and the current process ends.

In the above embodiment, the first and the second directions are taken with reference to the horizontal surface, i.e., relative to the horizontal surface.

It can be seen from the above first embodiment that, when a touch gesture is input through a mobile terminal, it is possible to ensure that the same input gesture of the user will trigger the same corresponding touch command, regardless of how the direction of the mobile terminal changes. Since a uniform operation gesture for the same operational instruction can be achieved by means of self-conversion of the mobile terminal, the user does not need to remember the respective touch gestures in different states of the mobile terminal, such that the user experience can be improved.

Figure 2A:
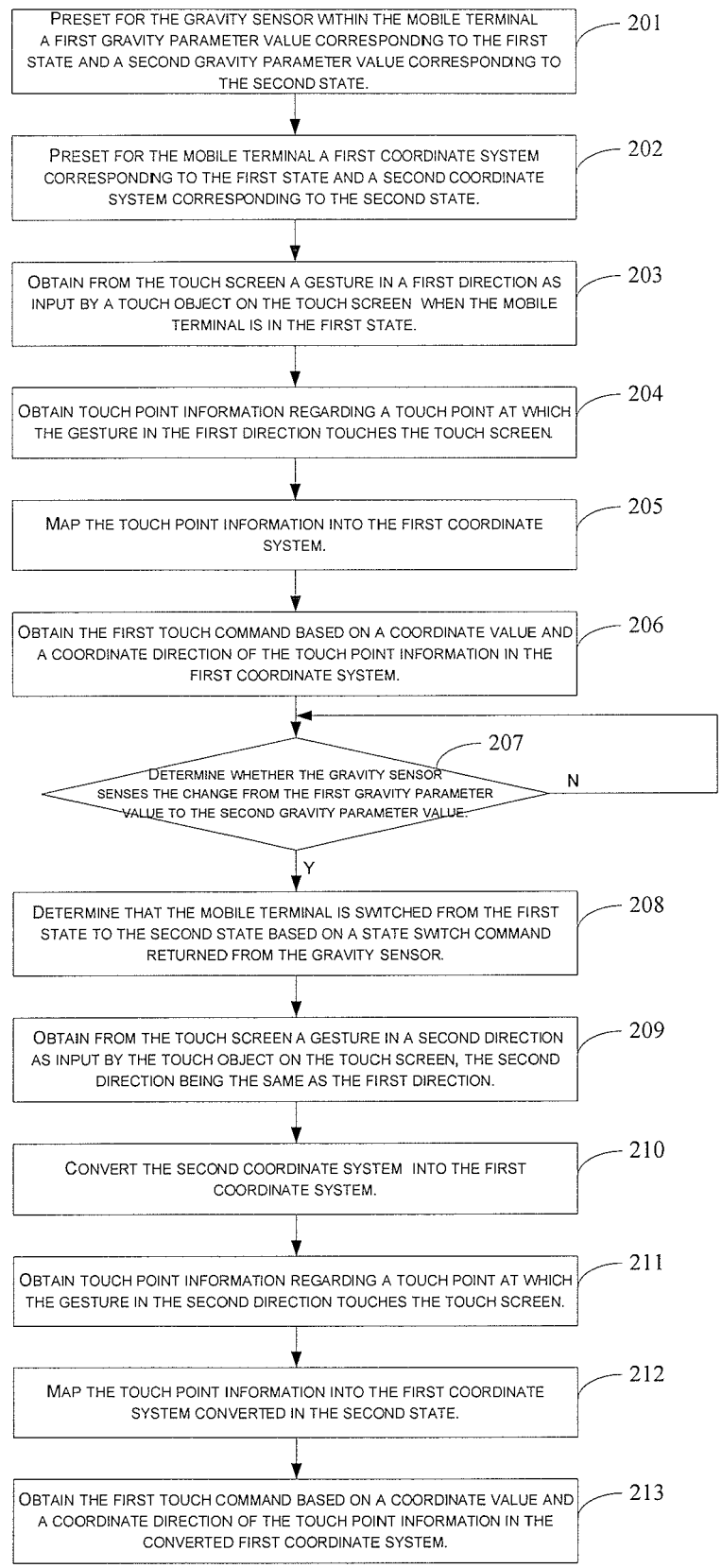
FIG. 2A is a flowchart illustrating the second embodiment of the method for processing touch input according to the present invention.

Reference is now made to FIG. 2A, which is a flowchart illustrating the second embodiment of the method for processing touch input according to the present invention. In this embodiment, it is possible to ensure that the same input gesture will trigger the same touch command by conversion of coordinate system with respect to different states.

At step 201, a first gravity parameter value corresponding to the first state and a second gravity parameter value corresponding to the second state are preset for the gravity sensor within the mobile terminal.

At step 202, a first coordinate system corresponding to the first state and a second coordinate system corresponding to the second state are preset for the mobile terminal.

At step 203, a gesture in a first direction as input by a touch object on the touch screen is obtained from the touch screen when the mobile terminal is in the first state.

In the first state, the gravity sensor senses the first gravity parameter value. The touch object, which can be for example a finger or a stylus, inputs on the touch screen the gesture in the first direction corresponding to a particular touch command.

Herein, if the first direction is up direction, it instructs to display a menu. If the first direction is down direction, it instructs to hide a menu. If the first direction is left direction, it instructs to return back to the higher level of menu. However, these examples are illustrative only. Other correspondences between directions and gestures can be set depending on implementation requirement. In general, it is possible to determine the first direction indicates which one of up, down, left and right directions by setting ranges of angles. For example, a circle which is plotted counter-clockwise can be divided in the following manner. If the horizontally right direction represents 0° (or 360°), the first direction can be determined as the up direction if it is within the range from 40° to 140°, as the left direction if it is within the range from 140° to 230°, as the down direction if it is within the range from 230° to 310°, or as the right direction if it is within the range from 310° to 40°.

At step 204, touch point information regarding a touch point at which the gesture in the first direction touches the touch screen is obtained.

At step 205, the touch point information is mapped into the first coordinate system.

Figure 2B:
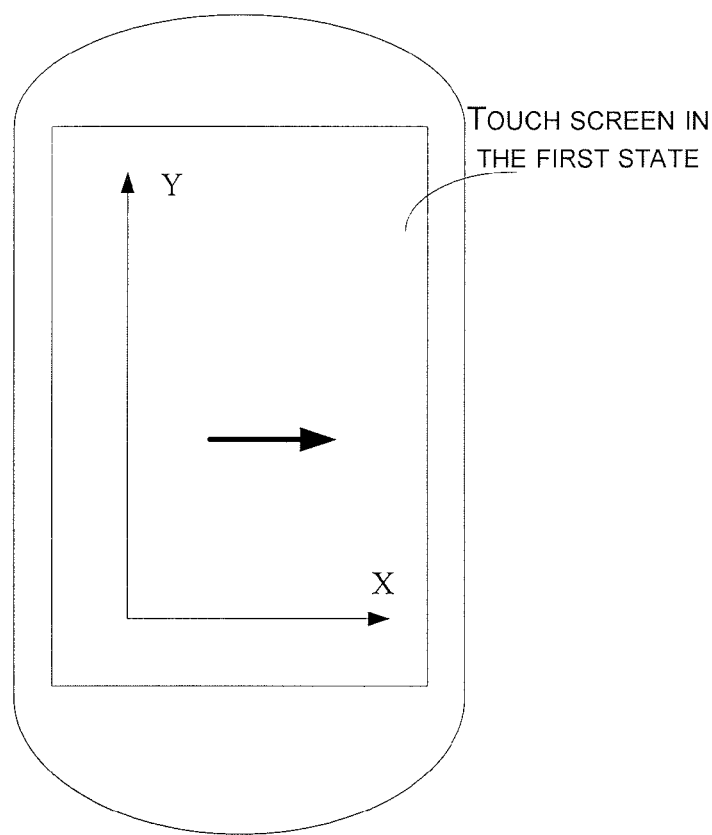
FIG. 2B is a schematic diagram showing the coordinate system when the mobile terminal is in the first state according to the above second embodiment of the present invention.

FIG. 2B is a schematic diagram showing the coordinate system when the mobile terminal is in the first state according to the above second embodiment of the present invention. As shown, the X axis and the Y axis represent the first coordinate system in the first state.

At step 206, the first touch command is obtained based on a coordinate value and a coordinate direction of the touch point information in the first coordinate system.

The arrow towards the right direction as shown in FIG. 2B represents the gesture in the first direction. This gesture corresponds to a sequence of touch points on the touch screen, regarding which touch point information can be mapped into the above first coordinate system. The coordinate value and the coordinate direction of the touch point information regarding the sequence of touch points can be obtained from the trace of the touch points. As shown in FIG. 2B, the first direction can be determined as the right direction.

At step 207, it is determined whether the gravity sensor senses the change from the first gravity parameter value to the second gravity parameter value. If this is the case, the process proceeds with step 208; otherwise, it returns to step 207.

The gravity sensor is always in an active state for sensing the change in gravity parameter. When the user switches the mobile terminal from the first state corresponding to the longitudinal screen to the second state corresponding to the lateral screen, the parameter sensed by the gravity sensor will change from the first gravity parameter value to the second gravity parameter value accordingly.

At step 208, it is determined that the mobile terminal is switched from the first state to the second state based on a state switch command returned from the gravity sensor.

At step 209, a gesture in a second direction as input by the touch object on the touch screen is obtained from the touch screen. The second direction is the same as the first direction.

Herein, in consistent with the settings for the first state, if the second direction is up direction, it instructs to display a menu. If the second direction is down direction, it instructs to hide a menu. If the second direction is left direction, it instructs to return back to the higher level of menu. In the second state, it is also possible to determine the second direction indicates which one of up, down, left and right directions by setting ranges of angles. The setting of the ranges of angles can be the same as, or independent of, the setting in the first state. For example, again, a circle which is plotted counter-clockwise can be divided in the following manner. If the horizontally right direction represents 0° (or 360°), the second direction can be determined as the up direction if it is within the range from 40° to 130°, as the left direction if it is within the range from 130° to 230°, as the down direction if it is within the range from 230° to 320°, or as the right direction if it is within the range from 320° to 40°.

At step 210, the second coordinate system can be converted into the first coordinate system.

Figure 2C:
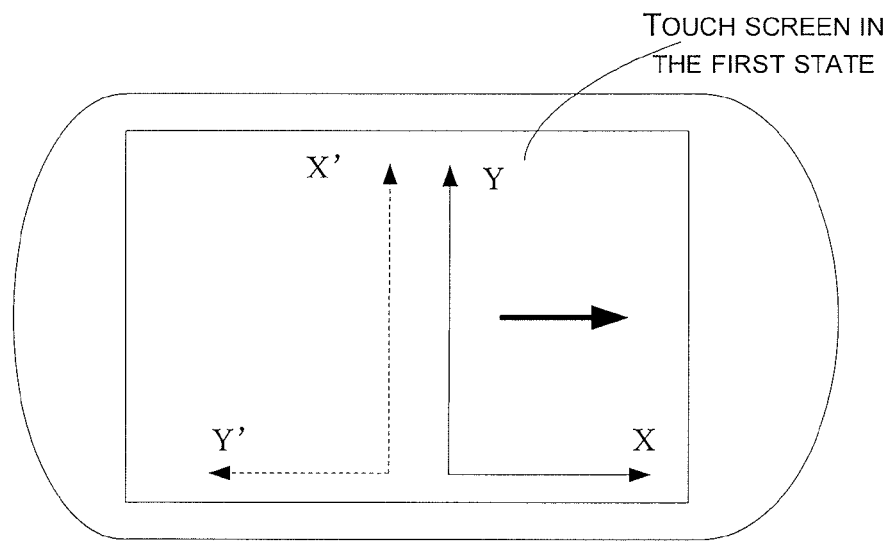
FIG. 2C is a schematic diagram showing the conversion of the coordinate system when the mobile terminal is in the second state according to the above second embodiment of the present invention.

FIG. 2C is a schematic diagram showing the coordinate system when the mobile terminal is in the second state according to the above second embodiment of the present invention. As shown, the X' axis and the Y' axis represent the second coordinate system in the second state. In order to make the second coordinate system to be the same as the first coordinate system as shown in FIG. 2B such that an input gesture in the same direction will trigger the same touch command, the second coordinate system composed of the X' and Y' axes as indicated in dashed lines in FIG. 2C is converted into the first coordinate system composed of the X and Y axes as indicated in solid lines.

At step 211, touch point information regarding a touch point at which the gesture in the second direction touches the touch screen is obtained.

At step 212, the touch point information is mapped into first coordinate system converted in the second state.

At step 213, the first touch command is obtained based on a coordinate value and a coordinate direction of the touch point information in the converted first coordinate system and the current process ends.

The arrow towards the right direction as shown in FIG. 2C represents the gesture in the second direction. Like the above first direction, this gesture corresponds to a sequence of touch points on the touch screen, regarding which touch point information can be mapped into the above converted first coordinate system. The coordinate value and the coordinate direction of the touch point information can be obtained from the trace of the touch information. As shown in FIG. 2C, the second direction can be determined as the right direction and the touch command corresponding to the second direction is the same as the touch command corresponding to the first direction. In this way, the user can obtain the same touch command by inputting the same gesture, regardless of whether the mobile terminal is in the first or the second state, such that the user experience can be improved.

Figure 3:
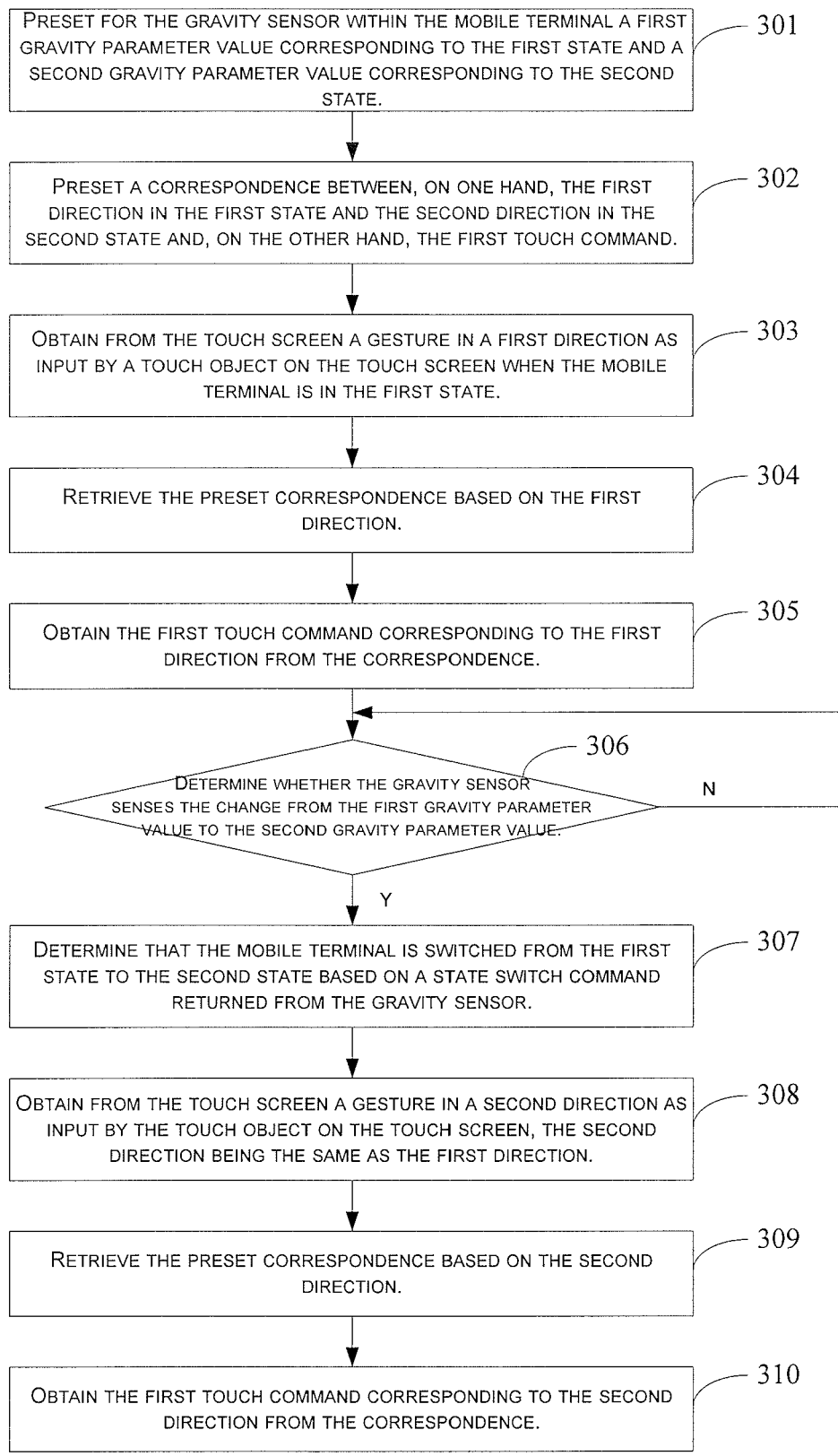
FIG. 3 is a flowchart illustrating the third embodiment of the method for processing touch input according to the present invention.

FIG. 3 is a flowchart illustrating the third embodiment of the method for processing touch input according to the present invention. In this embodiment, it is possible to ensure that the same touch gesture will trigger the same touch command by presetting for each state a correspondence between gestures and touch commands.

At step 301, a first gravity parameter value corresponding to the first state and a second gravity parameter value corresponding to the second state are preset for the gravity sensor within the mobile terminal.

At step 302, a correspondence is preset between, on one hand, the first direction in the first state and the second direction in the second state and, on the other hand, the first touch command.

The correspondence between a directional gesture in each state and a touch command can be preset in a list as shown in Table 1 below.

TABLE 1

| Touch Command | State of Mobile Terminal | Description of Directional Gestures |
| --- | --- | --- |
| Return to higher level of menu | First state | Slide from right to left |
|  | Second state | Slide from right to left |
| Display menu | First state | Slide upwards |
|  | Second state | Slide upwards |
| Hide menu | First state | Slide downwards |
|  | Second state | Slide downwards |

The information in the above Table 1 can be stored in a touch sensor in advance. When a gesture in a particular direction is received, a corresponding touch command can be obtained by looking up in the table. As it is preset that the same directional gesture corresponds to the same touch command in the first and the second states, subsequently, the same touch command can be triggered by inputting the same directional gesture regardless of whether the mobile terminal is in the first or the second state.

At step 303, a gesture in a first direction as input by a touch object on the touch screen is obtained from the touch screen when the mobile terminal is in the first state.

At step 304, the preset correspondence is retrieved based on the first direction.

At step 305, the first touch command corresponding to the first direction is obtained from the correspondence.

At step 306, it is determined whether the gravity sensor senses the change from the first gravity parameter value to the second gravity parameter value. If this is the case, the process proceeds with step 307; otherwise, it returns to step 306.

At step 307, it is determined that the mobile terminal is switched from the first state to the second state based on a state switch command returned from the gravity sensor.

At step 308, a gesture in a second direction as input by the touch object on the touch screen is obtained from the touch screen. The second direction is the same as the first direction.

At step 309, the preset correspondence is retrieved based on the second direction.

At step 310, the first touch command corresponding to the second direction is obtained from the correspondence. The current process ends In correspondence with the embodiments of the method for processing touch input according to the present invention, embodiments of the mobile terminal is also provided according to the present invention.

The mobile terminal according to an embodiment of the present invention has a rectangular touch screen with long sides and short sides. The mobile terminal having two states: a first state in which only the short sides are parallel with a horizontal surface and a second state in which only the long sides are parallel with the horizontal surface. In an embodiment, the mobile terminal can further comprise a gravity sensor.

Figure 4:
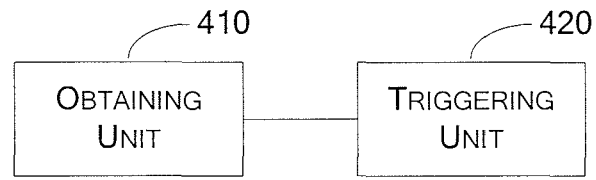
FIG. 4 is a block diagram of the first embodiment of the mobile terminal according to the present invention.

FIG. 4 is a block diagram of the first embodiment of the mobile terminal according to the present invention.

The mobile terminal comprises an obtaining unit 410 and a triggering unit 420.

The obtaining unit 410 is configured for obtaining from the touch screen a gesture in a first direction as input by a touch object on the touch screen when the mobile terminal is in the first state.

The triggering unit 420 is configured for triggering a first touch command in response to the gesture in the first direction.

Herein, the obtaining unit 410 is further configured for obtaining from the touch screen a gesture in a second direction as input by the touch object on the touch screen when the mobile terminal is in the second state. The second direction is the same as the first direction.

The triggering unit 420 is further configured for triggering the first touch command in response to the gesture in the second direction.

Figure 5:
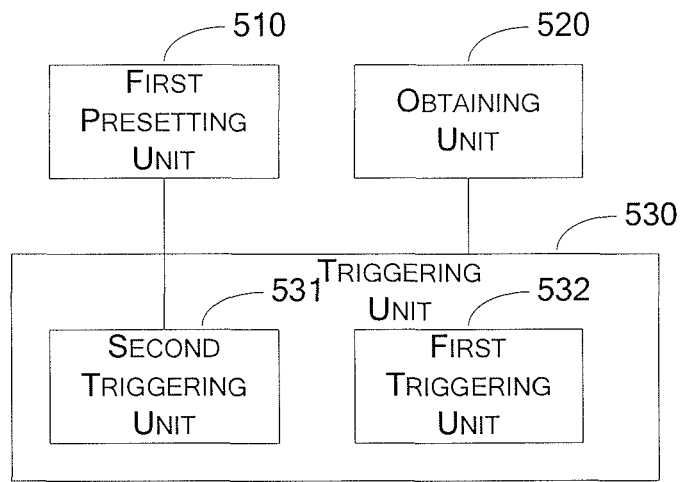
FIG. 5 is a block diagram of the second embodiment of the mobile terminal according to the present invention.

FIG. 5 is a block diagram of the second embodiment of the mobile terminal according to the present invention.

According to this embodiment, the mobile terminal comprises a first presetting unit 510, an obtaining unit 520 and a triggering unit 530. The triggering unit 530 comprises a first triggering unit 531 and a second triggering unit 532.

The first presetting unit 510 is configured for presetting for the mobile terminal a first coordinate system corresponding to the first state and a second coordinate system corresponding to the second state.

The obtaining unit 520 is configured for obtaining from the touch screen a gesture in a first direction as input by a touch object on the touch screen when the mobile terminal is in the first state.

The first triggering unit 531 is configured for triggering a first touch command in response to the gesture in the first direction.

The obtaining unit 520 is further configured for obtaining from the touch screen a gesture in a second direction as input by the touch object on the touch screen when the mobile terminal is in the second state. The second direction is the same as the first direction.

The second triggering unit 532 is configured for triggering the first touch command in response to the gesture in the second direction.

Specifically, the obtaining unit 520 may comprise (not shown in FIG. 5):
a parameter storage unit configured for storing a first gravity parameter value corresponding to the first state and a second gravity parameter value corresponding to the second state as preset gravity parameter values for the gravity sensor; and
a state determination unit configured for determining that the mobile terminal is in the first state if the gravity sensor senses the first gravity parameter value, or determining that the mobile terminal is in the second state if the gravity sensor senses the second gravity parameter value.

Specifically, the first triggering unit 531 may comprise (not shown in FIG. 5):
a first information obtaining unit configured for obtaining touch point information regarding a touch point at which the gesture in the first direction touches the touch screen;
a first information mapping unit configured for mapping the touch point information into the first coordinate system; and
a first command triggering unit configured for obtaining the first touch command based on a coordinate value and a coordinate direction of the touch point information in the first coordinate system.

Specifically, the second triggering unit 532 may comprise (not shown in FIG. 5):
a coordinate converting unit configured for converting the second coordinate system into the first coordinate system;
a second information obtaining unit configured for obtaining touch point information regarding a touch point at which the gesture in the second direction touches the touch screen;
a second information mapping unit configured for mapping the touch point information into the converted first coordinate system; and
a second command triggering unit configured for obtaining the first touch command based on a coordinate value and a coordinate direction of the touch point information in the first coordinate system.

Figure 6:
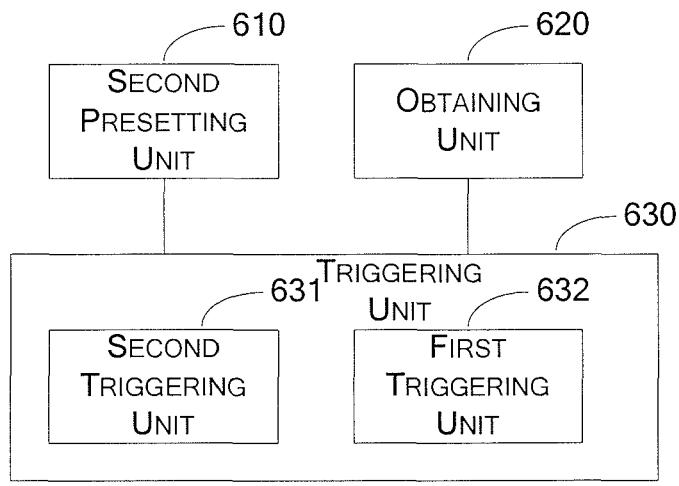
FIG. 6 is a block diagram of the third embodiment of the mobile terminal according to the present invention.

FIG. 6 is a block diagram of the third embodiment of the mobile terminal according to the present invention.

is According to this embodiment, the mobile terminal comprises a second presetting unit 610, an obtaining unit 620 and a triggering unit 630. The triggering unit 630 comprises a first triggering unit 631 and a second triggering unit 632.

The second presetting unit 610 is configured for presetting a correspondence between, on one hand, the first direction in the first state and the second direction in the second state and, on the other hand, the first touch command.

The obtaining unit 620 is configured for obtaining from the touch screen a gesture in a first direction as input by a touch object on the touch screen when the mobile terminal is in the first state.

The first triggering unit 631 is configured for triggering a first touch command in response to the gesture in the first direction.

The obtaining unit 620 is further configured for obtaining from the touch screen a gesture in a second direction as input by the touch object on the touch screen when the mobile terminal is in the second state. The second direction is the same as the first direction.

The second triggering unit 632 is configured for triggering the first touch command in response to the gesture in the second direction.

Specifically, the obtaining unit 620 may comprise (not shown in FIG. 6):
- a parameter storage unit configured for storing a first gravity parameter value corresponding to the first state and a second gravity parameter value corresponding to the second state as preset gravity parameter values for the gravity sensor; and
- a state determination unit configured for determining that the mobile terminal is in the first state if the gravity sensor senses the first gravity parameter value, or determining that the mobile terminal is in the second state if the gravity sensor senses the second gravity parameter value.

Specifically, the first triggering unit 631 may comprise (not shown in FIG. 6):
- a first correspondence retrieving unit configured for retrieving the preset correspondence based on the first direction; and
- a first command triggering unit configured for obtaining from the correspondence a first touch command corresponding to the first direction.

Specifically, the second triggering unit 632 may comprise (not shown in FIG. 6):
- a second correspondence retrieving unit configured for retrieving the preset correspondence based on the second direction; and
- a second command triggering unit configured for obtaining from the correspondence the first touch command corresponding to the second direction.

It can be seen from the above the embodiments of the present invention that the mobile terminal according to the present invention has a rectangular touch screen with long sides and short sides. The mobile terminal has two states: a first state in which only the short sides are parallel with a horizontal surface and a second state in which only the long sides are parallel with the horizontal surface. A gesture in a first direction as input by a touch object on the touch screen is obtained from the touch screen when the mobile terminal is in the first state. A first touch command is triggered in response to the gesture in the first direction. A gesture in a second direction as input by the touch object on the touch screen is obtained from the touch screen when the mobile terminal is in the second state, the second direction being the same as the first direction. The first touch command is triggered in response to the gesture in the second direction. With the embodiments of the present application, when a touch gesture is input through a mobile terminal, it is possible to ensure that the same input gesture of the user will trigger the same corresponding touch command, regardless of how the orientation of the mobile terminal changes. Since a uniform operation gesture for the same operational instruction can be achieved by means of self-conversion of the mobile terminal, the user does not need to remember the respective touch gestures in different states of the mobile terminal, such that the user experience can be improved.

It can be appreciated by those skilled in the art that the solutions according to the embodiments of the present invention can be implemented in software in combination with a general hardware platform as desired. Therefore, the solutions according to the embodiments of the present invention, or the portions thereof contributive to the prior art, can be substantially embodied in software product. Such a computer software product can be stored in a storage medium such as ROM/RAM, magnetic disk or optical disc. The storage medium may carry instructions for enabling a computer device (which may be a personal computer, a server or a network device) to implement the method according to the embodiments (or some portion thereof) according to the present invention.

The embodiments of the present invention have been described in a progressive manner such that the same or similar portions of the embodiments can reference each other. The description of each embodiment focuses on its differences from other embodiments. In particular, the product embodiments have been explained in a simplified manner as they are substantially similar to the method embodiments. The definitions of the method embodiments also apply to the product embodiments.

The present invention is not limited to the above described embodiments. A number of modifications, equivalent alternatives and improvements can be made by those skilled in the art without departing from the spirit and principle of the present invention. These modifications, equivalent alternatives and improvements are encompassed by the scope of the present invention.

What is claimed is:

1. A method for processing touch input, applied in a mobile terminal having a rectangular touch screen with long sides and short sides, the mobile terminal having two states: a first state in which only the short sides are parallel with a horizontal surface and a second state in which only the long sides are parallel with the horizontal surface, and a first coordinate system corresponding to the first state and a second coordinate system corresponding to the second state are preset for the mobile terminal, the method comprising:
- obtaining from the touch screen a gesture in a first direction as input by a touch object on the touch screen when the mobile terminal is in the first state;
- triggering a first touch command in response to the gesture in the first direction;
- obtaining from the touch screen a gesture in a second direction as input by the touch object on the touch screen when the mobile terminal is in the second state, the second direction being the same as the first direction relative to the horizontal surface, and the second direction being different from the first direction relative to the touch screen; and
- triggering the first touch command in response to the gesture in the second direction,
- wherein the step of triggering the first touch command in response to the gesture in the second direction comprises:
  - converting the second coordinate system into the first coordinate system;
  - obtaining touch point information regarding a touch point at which the gesture in the second direction touches the touch screen;
  - mapping the touch point information into the converted first coordinate system; and
  - obtaining the first touch command based on a coordinate value and a coordinate direction of the touch point information in the first coordinate system.

2. The method according to claim 1, wherein the mobile terminal comprises a gravity sensor and the method further comprises:
- presetting for the gravity sensor a first gravity parameter value corresponding to the first state and a second gravity parameter value corresponding to the second state; and
- determining that the mobile terminal is in the first state if the gravity sensor senses the first gravity parameter value, or determining that the mobile terminal is in the second state if the gravity sensor senses the second gravity parameter value.

3. The method according to claim 1, wherein the step of triggering a first touch command in response to the gesture in the first direction comprises:
obtaining touch point information regarding a touch point at which the gesture in the first direction touches the touch screen;
mapping the touch point information into the first coordinate system; and
obtaining the first touch command based on a coordinate value and a coordinate direction of the touch point information in the first coordinate system.

4. The method according to claim 1, further comprising:
presetting a correspondence between, on one hand, the first direction in the first state and the second direction in the second state and, on the other hand, the first touch command.

5. The method according to claim 1, wherein the first touch command is one of Return to higher level of menu, Display menu, and Hide menu.

6. A mobile terminal having a rectangular touch screen with long sides and short sides, the mobile terminal having two states: a first state in which only the short sides are parallel with a horizontal surface and a second state in which only the long sides are parallel with the horizontal surface, and a first coordinate system corresponding to the first state and a second coordinate system corresponding to the second state are preset for the mobile terminal, the mobile terminal comprising:
a processor;
a memory stored computer program code thereon which, when running in the processor, causes the mobile terminal to:
obtain from the touch screen a gesture in a first direction as input by a touch object on the touch screen when the mobile terminal is in the first state; and
trigger a first touch command in response to the gesture in the first direction;
obtain from the touch screen a gesture in a second direction as input by the touch object on the touch screen when the mobile terminal is in the second state, the second direction being the same as the first direction relative to the horizontal surface, and the second direction being different from the first direction relative to the touch screen; and
convert the second coordinate system into the first coordinate system;
obtain touch point information regarding a touch point at which the gesture in the second direction touches the touch screen;
map the touch point information into the converted first coordinate system;
obtain the first touch command based on a coordinate value and a coordinate direction of the touch point information in the first coordinate system; and
trigger the first touch command in response to the gesture in the second direction.

7. The mobile terminal according to claim 6, further comprising a gravity sensor, wherein the mobile terminal is further caused to:
store a first gravity parameter value corresponding to the first state and a second gravity parameter value corresponding to the second state as preset gravity parameter values for the gravity sensor; and
determine that the mobile terminal is in the first state if the gravity sensor senses the first gravity parameter value, or determine that the mobile terminal is in the second state if the gravity sensor senses the second gravity parameter value.

8. The mobile terminal according to claim 6, further caused to:
obtain touch point information regarding a touch point at which the gesture in the first direction touches the touch screen;
map the touch point information into the first coordinate system; and
obtain the first touch command based on a coordinate value and a coordinate direction of the touch point information in the first coordinate system.

9. The mobile terminal according to claim 6, wherein the first touch command is one of Return to higher level of menu, Display menu, and Hide menu.

\* \* \* \* \*